US010571178B2

(12) United States Patent
Tsukii et al.

(10) Patent No.: US 10,571,178 B2
(45) Date of Patent: Feb. 25, 2020

(54) AIR CONDITIONER AND MOTOR CONTROLLER (71) Applicant: HITACHI-JOHNSON CONTROLS AIR CONDITIONING, INC., Tokyo (JP)

(72) Inventors: Koji Tsukii, Tokyo (JP); Yoji Ogura, Tokyo (JP); Kazuhiro Ueta, Tokyo (JP)

(73) Assignee: Hitachi-Johnson Controls Air Conditioning, Inc., Tokyo (JP)

(*) Notice: Subject to any disclaimer, the term of this patent is extended or adjusted under 35 U.S.C. 154(b) by 0 days.

(21) Appl. No.: 16/088,922

(22) PCT Filed: Nov. 27, 2017

(86) PCT No.: PCT/JP2017/042374
§ 371 (c)(1),
(2) Date: Sep. 27, 2018

(87) PCT Pub. No.: WO2019/102611
PCT Pub. Date: May 31, 2019

(65) Prior Publication Data
US 2019/0368797 A1   Dec. 5, 2019

(51) Int. Cl.
F25B 49/02  (2006.01)
F25B 31/02  (2006.01)
F24F 11/30  (2018.01)

(52) U.S. Cl.
CPC ............ F25B 49/025 (2013.01); F24F 11/30 (2018.01); F25B 31/026 (2013.01);
(Continued)

(58) Field of Classification Search
CPC .................. F25B 31/026; F25B 49/025; F25B 2600/021; F25B 2600/15; F25B 2600/171
See application file for complete search history.

(56) References Cited

U.S. PATENT DOCUMENTS 6,220,045 B1* 4/2001 Kim ...................... F25B 49/025
                                                 62/228.4
2006/0198744 A1* 9/2006 Lifson .................... F04B 17/03
                                                 417/423.1
2017/0254575 A1* 9/2017 Beckmann ................ H02P 3/08

FOREIGN PATENT DOCUMENTS

CN    105698453 A    6/2016
JP      3291284 B2    6/2002
(Continued)

OTHER PUBLICATIONS

Korean Office Action received in corresponding Korean Application No. 10-2018-7027837 dated Sep. 26, 2019.
(Continued)

Primary Examiner — Jonathan Bradford
(74) Attorney, Agent, or Firm — Mattingly & Malur, PC (57) ABSTRACT An air conditioner is provided that reduces user discomfort due to vibrations and noises at a compressor, piping, and the like such as of an air conditioner. To achieve this, an air conditioner includes: a compressor (10) that has a motor (12) and a compression mechanism (14) driven by the motor (12); a speed detector (43) that detects a rotation speed of the motor (12); a drive mode controller (48) that controls a drive mode of the motor (12); and refrigerant piping that is connected to the compression mechanism (14) and allows a refrigerant to flow therethrough, wherein the drive mode controller (48), for stopping the motor (12), decelerates the motor (12) to a rotation speed equal to or lower than a resonance frequency between the compression mechanism (14) and the refrigerant piping.

4 Claims, 6 Drawing Sheets (52) U.S. Cl.
CPC ..... *F25B 2600/021* (2013.01); *F25B 2600/15* (2013.01); *F25B 2700/171* (2013.01)

(56) References Cited

FOREIGN PATENT DOCUMENTS

| | | |
|---|---|---|
| JP | 2005-009772 A | 1/2005 |
| JP | 4265601 B2 | 5/2009 |
| JP | 2012-110077 A | 6/2012 |
| KR | 10-2016-0097697 A | 8/2016 |

OTHER PUBLICATIONS

Taiwanese Office Action received in corresponding Taiwanese Application No. 107103175 dated Dec. 5, 2018.
International Search Report of PCT/JP2017/042374 dated Feb. 6, 2018.

\* cited by examiner

AIR CONDITIONER AND MOTOR CONTROLLER

CROSS-REFERENCE TO RELATED APPLICATION

This application is a U.S. National Stage Application under 35 U.S.C § 371 of International Patent Application No. PCT/JP2017/042374 filed 27 Nov. 2017, the disclosures of all of which are hereby incorporated by reference in their entireties.

TECHNICAL FIELD

The present invention relates to an air conditioner and a motor controller.

BACKGROUND ART

Japanese Patent No. 4265601 as listed below describes in claim 1, as a technique of controlling a motor of a compressor such as in an air conditioner, "the control unit, upon receiving a stop instruction, detects the rotation speed of the motor in operation by the speed detector and decelerates the motor, by the speed changing ratio changer, to a stopping speed at which an amount of torque control by an inverter is equal to or larger than a predetermined value, and then stops the motor at a rotor position specified by the stop position determiner."

SUMMARY OF THE INVENTION

Problems to be Solved

Incidentally, Japanese Patent No. 4265601 fails to particularly describe the relationship between the resonance frequency of the piping connected to the compressor of the air conditioner and the stopping speed. However, vibrations and noises generated by the compressor, piping and the like are increased, depending on the relationship between the resonance frequency and the stopping speed, to cause a problem that the user feels discomfort. The present invention has been made in view of the above-identified problems, and is intended to provide an air conditioner and a motor controller that reduce user discomfort due to vibrations and noises at a compressor, piping and the like.

Solution to Problems

In order to solve the above problems, an air conditioner of the present invention includes: a compressor that has a motor and a compression mechanism driven by the motor; a speed detector that detects a rotation speed of the motor; a drive mode controller that controls a drive mode of the motor; and refrigerant piping that is connected to the compression mechanism and allows a refrigerant to flow therethrough, wherein the drive mode controller, for stopping the motor, decelerates the motor to a rotation speed equal to or lower than a resonance frequency between the compression mechanism and the refrigerant piping.

Advantageous Effects of the Invention

The present invention reduces user discomfort due to vibrations and noises at a compressor, piping, and the like.

DETAILED DESCRIPTION OF EMBODIMENTS

First Embodiment

<Configuration>

Figure 1:
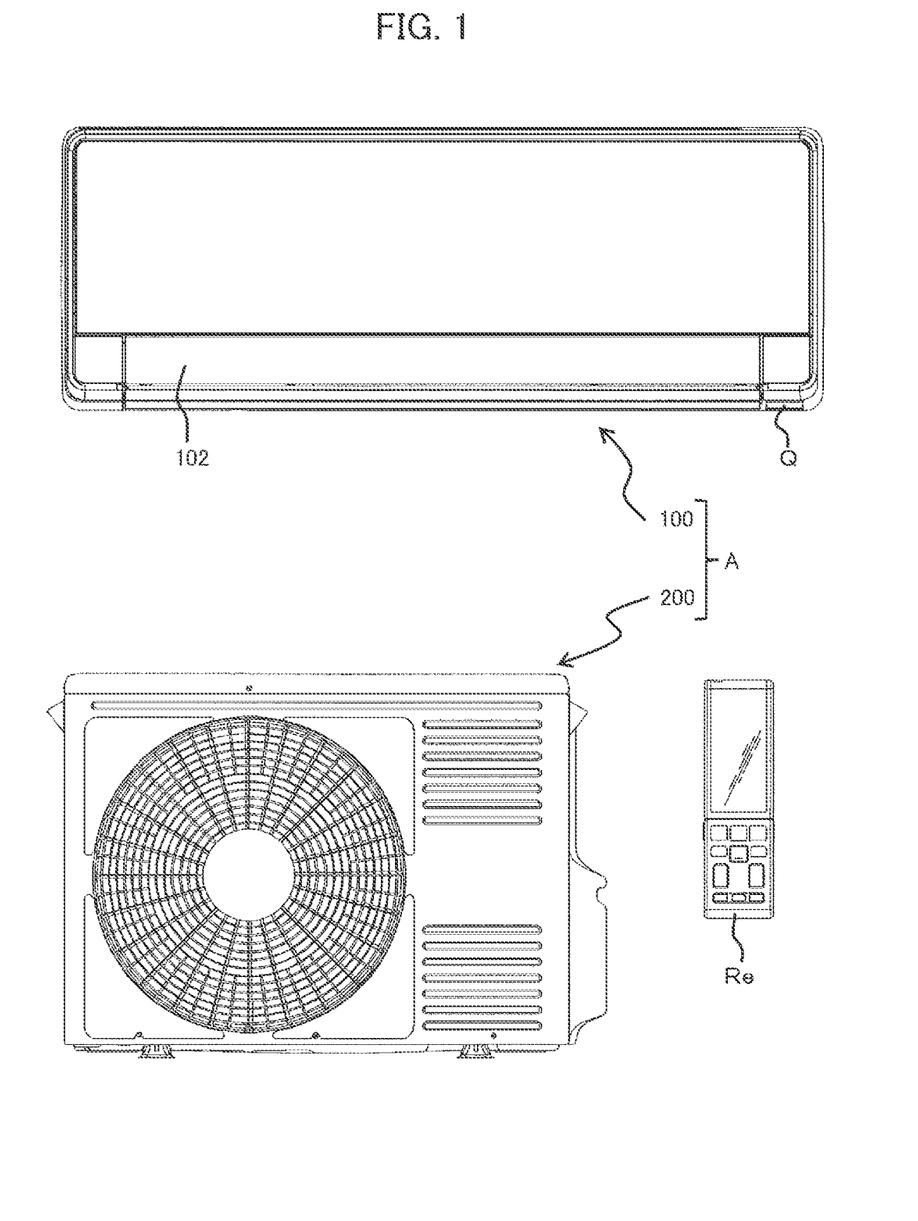
FIG. 1 shows a schematic configuration of an air conditioner according to a first embodiment of the present invention.

Hereinbelow, a description will be given of a configuration of an air conditioner A according to a first embodiment of the present invention, with reference to FIG. 1. Note that FIG. 1 is a front view of the air conditioner A. As shown in FIG. 1, the air conditioner A includes an indoor unit 100, an outdoor unit 200, and a remote controller Re. The indoor unit 100 is connected with the outdoor unit 200 via refrigerant piping (not shown), to air condition the room in which the indoor unit 100 is installed, by a refrigeration cycle to be described later. In addition, the indoor unit 100 and the outdoor unit 200 are configured to transmit and receive information to/from each other via a communication cable (not shown).

The remote controller Re is operated by a user to transmit an infrared signal to a remote control transceiver Q of the indoor unit 100. The signal includes a command such as a start request, a change in preset temperature, a timer, a change in operation mode, a stop request, and the like. Based on these signals, the air conditioner A executes air conditioning operation such as in a cooling mode, in a heating mode, and in a dehumidifying mode. In addition, the indoor unit 100 transmits data such as room temperature information, humidity information, and electricity charge information from the remote control transceiver Q to the remote controller Re. The indoor unit 100 has a vertical louver 102 provided at a front lower end thereof for controlling a vertical air flow direction. The vertical louver 102 is closed when the operation of the air conditioner A is stopped.

Figure 2:
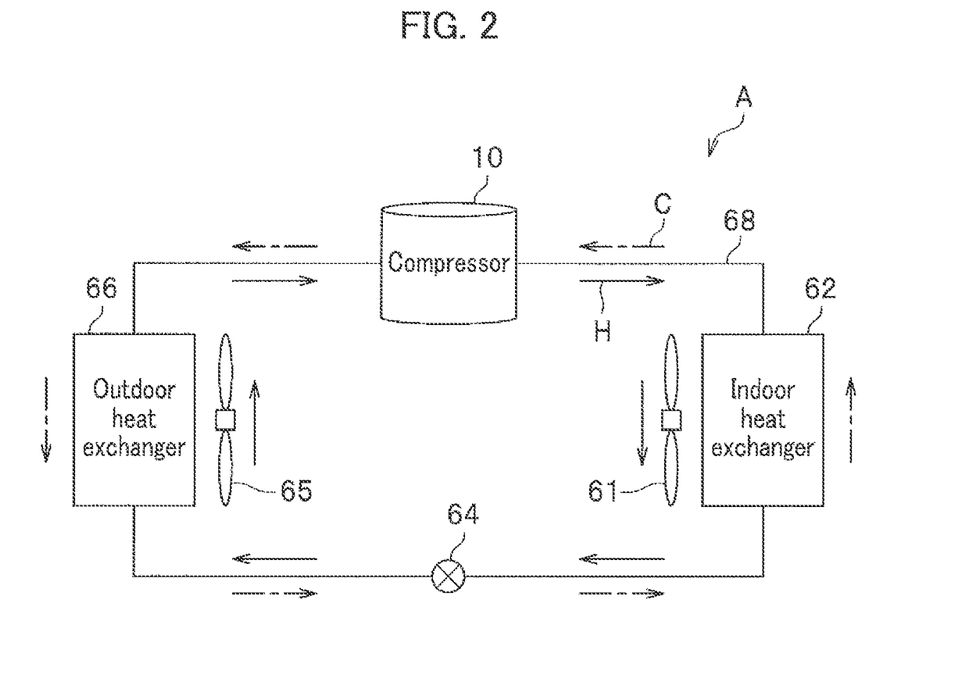
FIG. 2 illustrates a refrigeration cycle system of the air conditioner.

FIG. 2 shows a refrigeration cycle system of the air conditioner A according to the present embodiment. As shown in FIG. 2, the air conditioner A of the present embodiment includes: an indoor heat exchanger 62 that is arranged in the indoor unit 100 (see FIG. 1); an outdoor heat exchanger 66 that is arranged in the outdoor unit 200; an expansion valve 64 that is provided in the indoor unit 100 or the outdoor unit 200; a compressor 10 as described above, and refrigerant piping 68 that connects these elements 10, 62, 64, and 66. In FIG. 2, an arrowed line H indicates a flow of the refrigerant during the heating operation, while an arrowed line C indicates a flow of the refrigerant during the cooling operation. An indoor-unit fan 61 blows air to the indoor heat exchanger 62, while an outdoor-unit fan 65 blows air to the outdoor heat exchanger 66. Note that a four-way valve for switching a flow of refrigerant, and the like are not shown.

Figure 3:
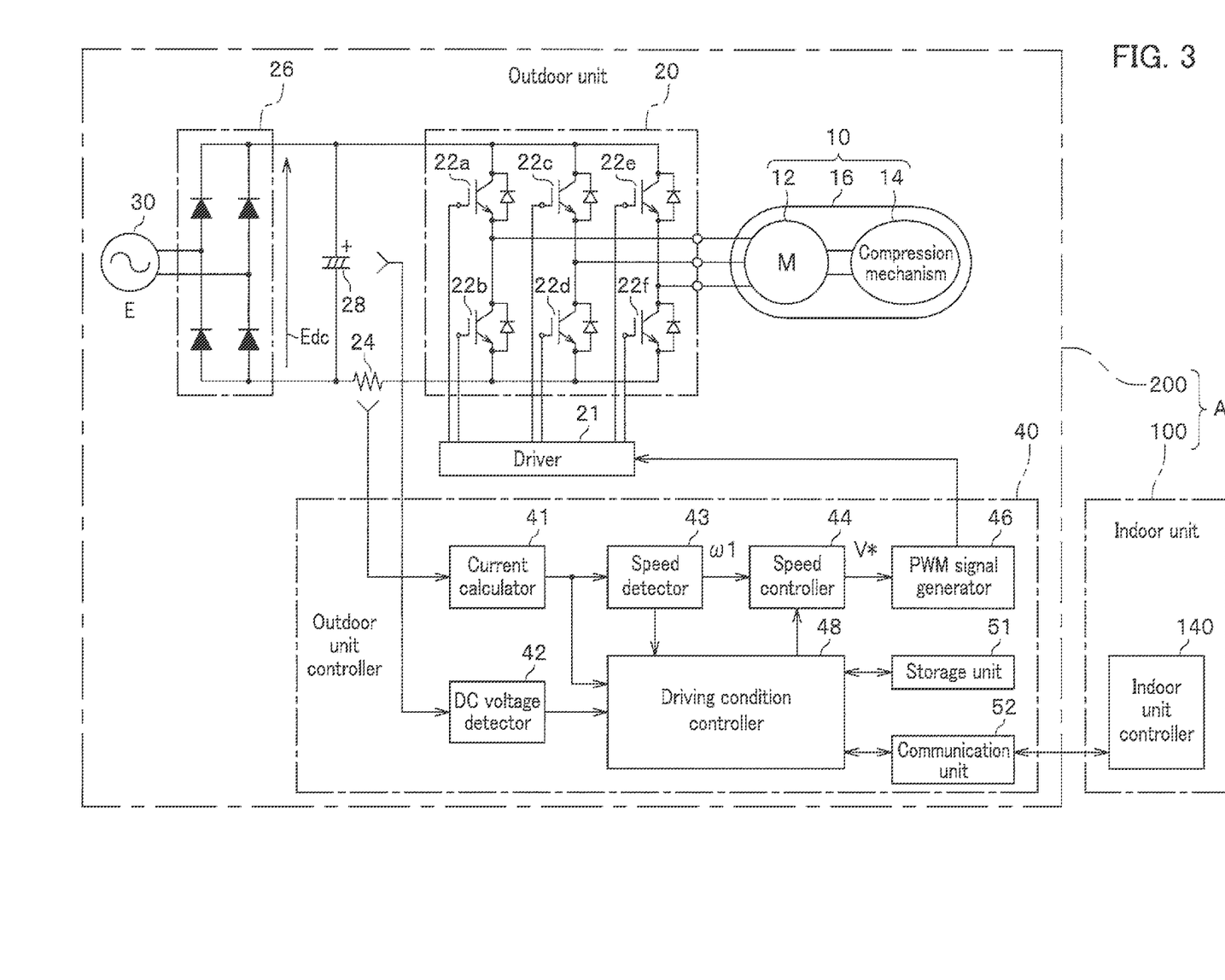
FIG. 3 is a block diagram of major parts of the air conditioner.

FIG. 3 is a block diagram of major parts of the air conditioner A. In FIG. 3, the outdoor unit 200 includes the compressor 10, an inverter 20, a driver 21, a rectification circuit 26, a smoothing capacitor 28, and an outdoor unit controller 40. In addition, the indoor unit 100 includes an indoor unit controller 140. Further, the compressor 10 in the outdoor unit 200 includes a motor 12, a compression mechanism 14 that is connected to the motor 12, and a sealed container 16 that houses these in an airtight state. Note that in the present embodiment, the compression mechanism 14 is a one-cylinder rotary compression mechanism. The motor 12 is a permanent-magnet three-phase synchronous electric motor.

In the outdoor unit 200, the rectifier circuit 26 rectifies the AC voltage supplied from a commercial power supply 30, and the smoothing capacitor 28 smoothes an output voltage of the rectifier circuit 26 to output a DC voltage Edc. The DC voltage Edc is inputted to the inverter 20. In addition, a shunt resistor 24 is inserted between the inverter 20 and the rectifier circuit 26. The inverter 20 has switching elements 22a to 22f and freewheeling diodes (having no reference numeral) connected back-to-back. Note that the switching elements 22a to 22f are collectively referred to as a "switching element 22" in some cases. In the present embodiment, an IGBT (Insulated Gate Bipolar Transistor) is used for each of these switching elements.

In the inverter 20, two switching elements 22 are connected in series to configure upper and lower arms for each phase. In the example in FIG. 3, the switching elements 22a and 22b configure upper and lower arms for a U phase, the switching elements 22c and 22d configure those for a V phase, and the switching elements 22e and 22f configure those for a W phase. The connection point between the upper and lower arms for each phase is connected to the motor 12 of the compressor 10. A drive signal supplied via the driver 21 from the outdoor unit controller 40 provides on/off control of the switching element 22. This causes the inverter 20 to modulate the DC voltage Edc with PWM (Pulse Width Modulation), based on the drive signal.

The outdoor unit controller 40 and the indoor unit controller 140 each include hardware as a general computer such as a CPU (Central Processing Unit), a RAM (Random Access Memory), and a ROM (Read Only Memory), wherein the ROM stores a control program to be executed by the CPU, various data, and the like. Within the outdoor unit controller 40 in FIG. 3, functions implemented such as by control programs are shown as blocks.

That is, the outdoor unit controller 40 includes a current calculator 41, a DC voltage detector 42, a speed detector 43, a speed controller 44, a PWM signal generator 46, a drive mode controller 48, a storage unit 51, and a communication unit 52. The DC voltage detector 42 detects the DC voltage Edc as described above. The current calculator 41 calculates a current value flowing through the inverter 20, based on a voltage drop in the shunt resistor 24.

The speed detector 43 detects a speed detection value $\omega 1$ of the motor 12 without using any sensor, based on the detection result of the current calculator 41. The drive mode controller 48 integrates the speed detection value $\omega 1$ to calculate an electrical angle of the motor 12, multiplies the electrical angle by the number of pole pairs of the motor 12 to calculate a mechanical angle of the motor 12, and outputs a torque command value according to the mechanical angle. A load torque generated by the compressor 10 pulsates so as to have a peak at a certain rotation angle. Then, the drive mode controller 48 outputs the torque command value (motor torque command value) that pulsates according to pulsation of the load torque, to reduce vibrations of the compressor 10.

The speed controller 44 outputs a voltage command value V* that achieves the motor torque according to the torque command value, based on the torque command value outputted from the drive mode controller 48 and the speed detection value $\omega 1$. The PWM signal generator 46 outputs a PWM signal according to the voltage command value V*. This PWM signal is buffered by the driver 21 and supplied to each switching element 22.

The communication unit 52 transmits and receives various commands and information to/from the indoor unit controller 140. The storage unit 51 stores various parameters to be used by the drive mode controller 48. In particular, the storage unit 51 stores one or more resonance frequencies $\omega p$. Here, the resonance frequency $\omega p$ is a resonance frequency of vibration generated between the compressor 10 in FIG. 2 and the refrigerant piping 68 around the compressor 10. When the rotation speed of the compressor 10 comes around the resonance frequency $\omega p$, vibrations and noises generated by the compressor 10 and the refrigerant piping 68 tend to be large. Note that in the one-cylinder rotary compressor 10, the resonance frequency is often a frequency of 20 Hz or less (in other words, a rotation speed of 20 RPS or less). Then, the one or more resonance frequencies $\omega p$ stored in the storage unit 51 are preferably frequencies of 20 Hz or less.

<Operation>

Figure 4:
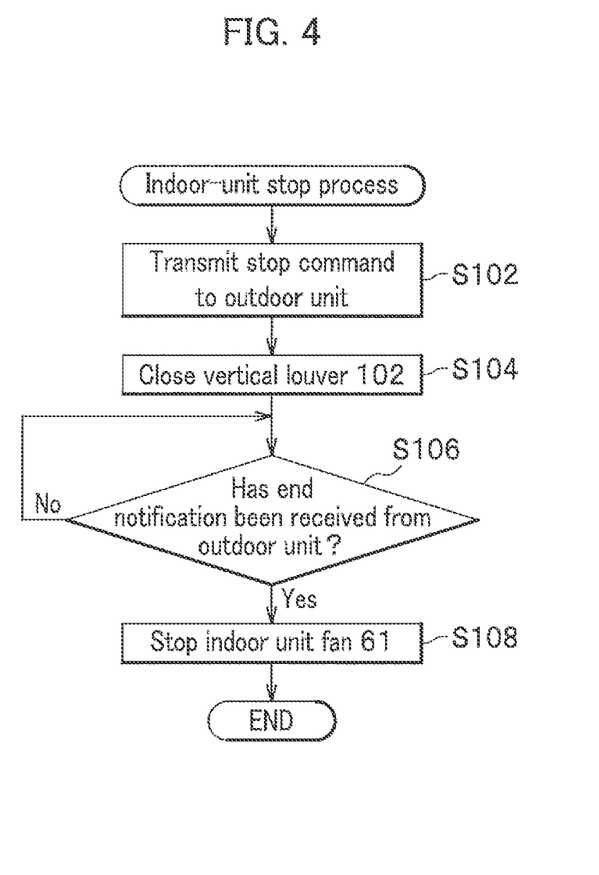
FIG. 4 is a flowchart of a stop routine executed in an indoor unit.

FIG. 4 is a flowchart of a stop routine executed in the indoor unit controller 140 of the indoor unit 100 (see FIG. 3). This routine is activated, for example, when the user initiates stop operation of the air conditioner A using the remote controller Re (see FIG. 1). At the time of the stop operation being initiated, the vertical louver 102 of the indoor unit 100 (see FIG. 1) is open and the indoor unit fan 61 is driven for rotation.

In step S102 in FIG. 4, the indoor unit controller 140 transmits a stop command to the outdoor unit controller 40 of the outdoor unit 200. Upon receiving this stop command, the outdoor unit controller 40 executes operation of stopping the motor 12 of the compressor 10. Note that details thereof will be described later.

Next, in step S104, the indoor unit controller 140 closes the vertical louver 102 of the indoor unit 100 (see FIG. 1). Next, in step S106, the indoor unit controller 140 determines whether or not an end notification has been received from the outdoor unit controller 40. Here, the "end notification" is a notification that the outdoor unit controller 40 has finished controlling the motor 12 of the compressor 10. As will be described in detail later, when the outdoor unit controller 40 outputs an end notification, the motor 12 is stopped or in a state of immediately being stopped. In step S106, the processing is on a wait until the result is determined to be "Yes." Once the indoor unit controller 140 receives the end notification, it proceeds to step S108. Here, the indoor unit controller 140 stops the indoor unit fan 61, and ends the processing of this routine.

In the stop routine, the vertical louver 102 is closed in step S104 before the indoor unit fan 61 is stopped in step S108, and the reason for doing this is as follows. In the present embodiment, the compressor 10 is gradually decelerated after the user has initiated stop operation of the air conditioner A using the remote controller Re (see FIG. 1), and accordingly it takes some time until the compressor 10 is completely stopped. If the indoor unit fan 61 (see FIG. 2) is stopped before the compressor 10 stops, the indoor heat exchanger 62 may have a risk of being overheated or overcooled. Then, the indoor unit fan 61 preferably keeps operating until the compressor 10 is completely stopped.

However, if the operation of the indoor unit fan 61 is simply continued, the user may have a doubt. The reason is that if the indoor unit fan 61 continues operation even though the user has initiated stop operation on the remote controller Re, the stop operation seems to be ignored. Then, in the present embodiment, once the stop routine (see FIG. 4) is activated, step S104 is executed at an early stage so as to close the vertical louver 102. This is because closing the vertical louver 102 allows the user to recognize that the air conditioner A is stopping, even if the indoor unit fan 61 is still in operation.

Figure 5:
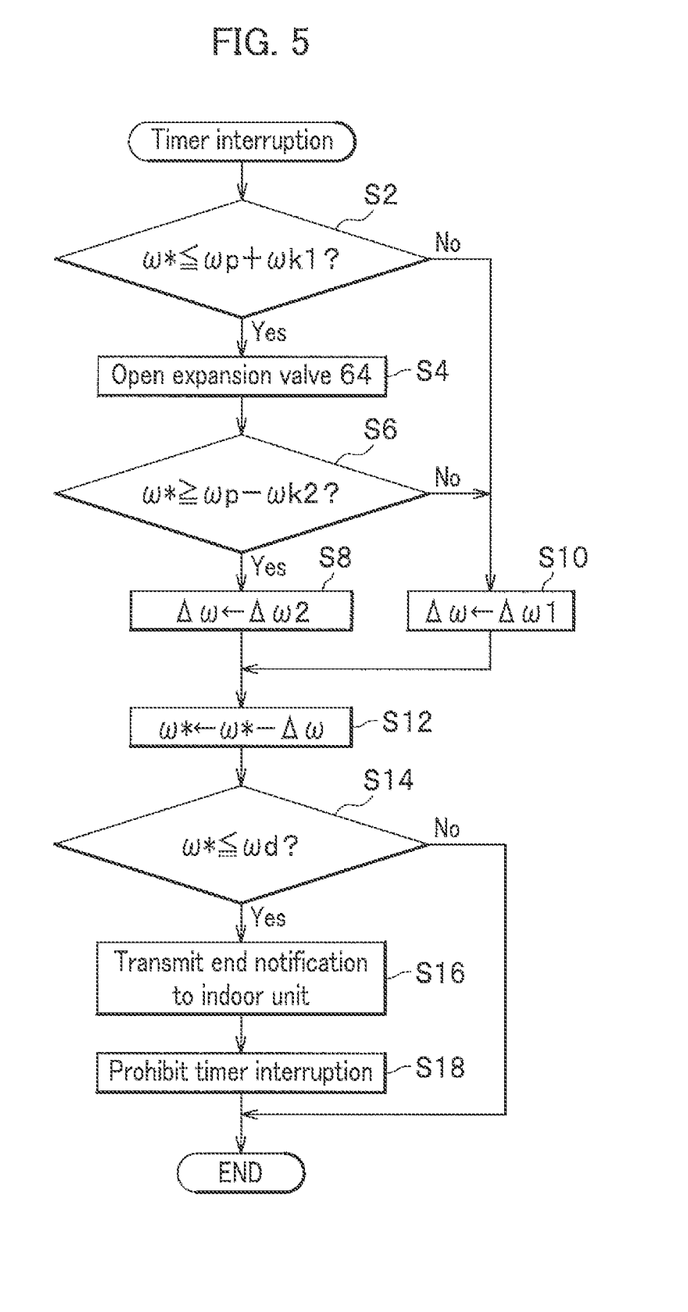
FIG. 5 is a flowchart of a timer interruption routine executed in an outdoor unit.

FIG. 5 is a flowchart of a timer interruption routine executed in the outdoor unit controller 40 of the outdoor unit 200 (see FIG. 3). Upon receiving the above-mentioned stop command from the indoor unit controller 140 (see step S102 in FIG. 4), the outdoor unit controller 40 thereafter executes the timer interruption routine at predetermined time intervals.

In step S2 in FIG. 5, the outdoor unit controller 40 determines whether "$\omega^* \leq \omega p + \omega k1$" holds true. Here, $\omega k1$ is a speed deviation to be described as follows. In the present embodiment, the speed command value $\omega^*$ is gradually decreased every time a timer interruption occurs. However, when the speed command value $\omega^*$ comes around the resonance frequency $\omega p$, the change rate (absolute value of the acceleration) of the speed command value $\omega^*$ is decreased to increase tracking capability of the torque control by the drive mode controller 48 (see FIG. 3) for reducing vibrations and noises.

Here, the "around the resonance frequency $\omega p$" is more particularly in a range between "$\omega p + \omega k1$" and "$\omega p - \omega k2$," where $\omega k1$ and $\omega k2$ are the upper and lower speed deviations, respectively. In this manner, the speed deviations $\omega k1$ and $\omega k2$ in the present embodiment are constants to define the range where the speed command value $\omega^*$ has its decreasing rate (absolute value of acceleration) reduced. Note that when a speed (e.g., speed command value $\omega^*$) is added to, subtracted from, or compared with a frequency (e.g., resonance frequency $\omega p$), the unit of frequency is Hz (Hertz) and the unit of speed is RPS (revolutions per second).

If the determination result is "Yes" in step S2 in FIG. 5, the processing proceeds to step S4. Here, the outdoor unit controller 40 opens the expansion valve 64 (see FIG. 2). This is for reducing a pressure difference between the suction side and the discharge side of the compressor 10 to reduce vibrations and noises. Next, in step S6, the outdoor unit controller 40 determines whether "$\omega^* \geq \omega p - \omega k2$" holds true. Here, if the determination result is "Yes," the processing proceeds to step S8, to set a speed command value reduction amount $\Delta \omega$ to a predetermined value $\Delta \omega 2$.

In contrast, if the determination result is "No" in step S6, the processing proceeds to step S10, to set the speed command value reduction amount $\Delta \omega$ to a predetermined value $\Delta \omega 1$. Note that this step S10 is also executed when the determination result is "No" in step S2 as described above. Next, in step S12, the outdoor unit controller 40 reduces the speed command value $\omega^*$ by the speed command value reduction amount $\Delta \omega$. Here, in the present embodiment, the predetermined values $\Delta \omega 1$ and $\Delta \omega 2$ have a relationship of "$\Delta \omega 1 > \Delta \omega 2$."

Next, in step S14, the outdoor unit controller 40 determines whether or not the speed command value $\omega^*$ is equal to or less than a predetermined control end speed $\omega d$. Here, the control end speed $\omega d$ is a speed at which the outdoor unit controller 40 ends controlling the motor 12, and can be "0." If the control end speed $\omega d$ is "0," the outdoor unit controller 40 executes the torque control by the drive mode controller 48 until the motor 12 stops. Alternatively, the control end speed $\omega d$ may be a value exceeding "0." However, in order to reduce vibrations and noises of the compressor 10, the control end speed $\omega d$ preferably satisfies a relationship of "$\omega d \leq \omega p - \omega k2$" for all the resonance frequencies $\omega p$.

If the determination result is "No" in step S14, the routine ends. Therefore, as long as the speed command value $\omega^*$ exceeds the control end speed $\omega d$, the speed command value $\omega^*$ decreases by the predetermined value $\Delta \omega 1$ or $\Delta \omega 2$ every time a timer interruption occurs. When the speed command value $\omega^*$ becomes equal to or less than the control end speed $\omega d$, the determination result is now "Yes" in step S14, and the processing proceeds to step S16.

In step S16, the outdoor unit controller 40 transmits the above-mentioned end notification to the indoor unit controller 140. As a result, the indoor unit fan 61 is stopped in the indoor unit 100, as described above (in step S108 in FIG. 4). Next, in step S18, any further timer interruption is prohibited. This also prohibits the timer interruption routine from being activated. In the case of the control end speed $\omega d$ having a value exceeding "0," the motor 12 is still slightly rotating at this point. However, the rotation speed has a sufficiently small value and therefore the motor 12 stops before long without causing many vibrations and noises.

Figure 6:
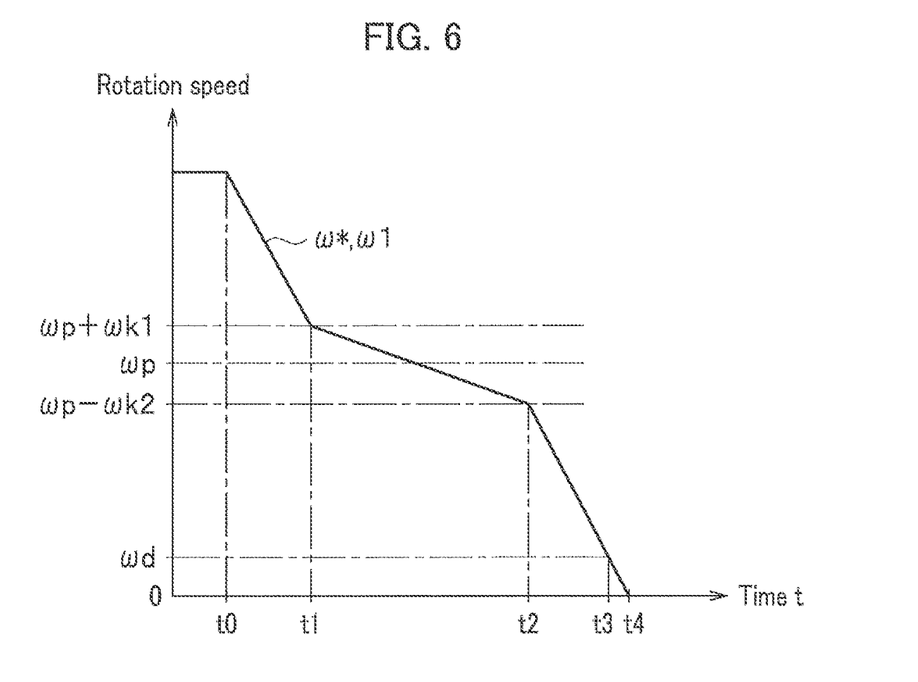
FIG. 6 is an operation chart of the first embodiment.

FIG. 6 is a chart showing an example of transition of the speed detection value $\omega 1$ and the speed command value $\omega^*$ in the present embodiment. Note that the motor 12 is a permanent-magnet three-phase synchronous electric motor, and then the speed detection value $\omega 1$ and the speed command value $\omega^*$ are substantially equal to each other, as indicated in the drawing. It is assumed that the speed command value $\omega^*$ was constant before time t0 in FIG. 6, and the outdoor unit controller 40 has received a stop command from the indoor unit controller 140 at time t0. As a result, the timer interruption routine (see FIG. 5) is called after time t0 at predetermined time intervals.

At time t0, the speed command value $\omega^*$ exceeds "$\omega p + \omega k1$," and then the speed command value $\omega^*$ decreases with a slope in proportion to the predetermined value $\Delta \omega 1$. Once "$\omega^* \leq \omega p + \omega k1$" holds true at time t1, the speed command value $\omega^*$ decreases thereafter with a slope in proportion to the predetermined value $\Delta \omega 2$. As described above, the predetermined values $\Delta \omega 1$, $\Delta \omega 2$ have a relationship of "$\Delta \omega 1 > \Delta \omega 2$" in the present embodiment, and accordingly the speed command value $\omega^*$ has a smaller decreasing rate (absolute value of acceleration) after time t1 than that before time t1.

As described above, when the speed command value $\omega^*$ decreases at the decreasing rate in proportion to the predetermined value $\Delta \omega 2$, the speed command value $\omega^*$ eventually becomes equal to or less than "$\omega p - \omega k2$." It is assumed that this timing is time t2. As a result, the speed command value $\omega^*$ has its decreasing rate in proportion to the predetermined value $\Delta \omega 1$ again after time t2. When the speed command value $\omega^*$ reaches the control end speed $\omega d$ at time t3, the outdoor unit controller 40 stops controlling the motor 12, and the motor 12 is decelerated naturally thereafter and stops before long. It is assumed that the motor 12 stops at time t4.

Advantageous Effects

As described above, when stopping the motor 12, the drive mode controller 48 in the air conditioner A of the present embodiment decelerates the motor 12 to a rotation speed equal to or lower than the resonance frequency ωp between the compression mechanism 14 and the refrigerant piping 68. As a result, vibrations and noises of the motor 12 are reduced, and accordingly user discomfort due to vibrations and noises is also reduced.

In addition, when the rotation speed of the motor 12 falls within a predetermined range between "ωp+ωk1" and "ωp−ωk2" centered around the resonance frequency ωp, the drive mode controller 48 controls the motor 12 so that the absolute value of the acceleration of the motor 12 is smaller than that when the rotation speed falls otherwise. This allows control by the drive mode controller 48 to further reduce vibrations and noises of the motor 12 around the resonance frequency ωp.

Further, the drive mode controller 48, for stopping the motor 12, decelerates the motor 12 to a rotation speed equal to or lower than the resonance frequency ωp between the compression mechanism 14 and the refrigerant piping 68, while controlling a torque of the motor 12. This torque control further reduces vibrations and noises of the motor 12. Additionally, with the configuration in which the motor 12 is decelerated to a rotation speed of zero, while the torque of the motor 12 is controlled, vibrations and noises are further reduced until the motor 12 stops.

Second Embodiment

Next, a description will be given of an air conditioner according to a second embodiment of the present invention. The hardware configuration and program contents of the air conditioner according to the second embodiment are the same as those of the first embodiment (FIGS. 1 to 5). However, in the present embodiment, predetermined values Δω1, Δω2 (see FIG. 5) have a relationship of "Δω2>Δω1." That is, the magnitude relation is opposite to that in the first embodiment.

Figure 7:
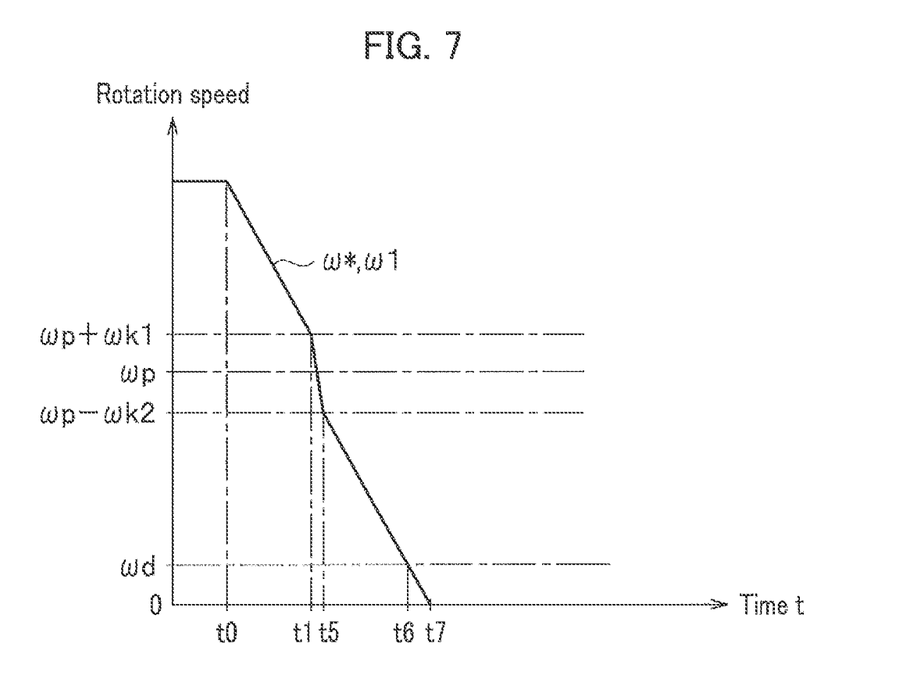
FIG. 7 is an operation chart of a second embodiment.

FIG. 7 is a chart showing an example of transition of the speed detection value ω1 and the speed command value ω* in the present embodiment. It is also assumed in FIG. 7 that the speed command value ω* was constant before time t0, and the outdoor unit controller 40 has received a stop command from the indoor unit controller 140 at time t0. The speed detection value ω1 and the speed command value ω* before time t1 in FIG. 7 are the same as those in FIG. 6. Then, once "w*≤ωp+ωk1" holds true at time t1, the speed command value ω* decreases thereafter with a slope in proportion to the predetermined value Δω2. As Δω2 is larger than Δω1 in the present embodiment, the speed command value ω* has a greater decreasing rate (absolute value of acceleration) after time t1 than that before time t1.

Once "ωd≤ωp−ωk2" holds true at time t5, the speed command value ω* has its decreasing rate in proportion to the predetermined value Δω1 again. Then, when the speed command value ω* reaches the control end speed ωd at time t6, the outdoor unit controller 40 stops controlling the motor 12, and the motor 12 is decelerated naturally thereafter and stops before long. It is assumed that the motor 12 stops at time t7.

When vibrations and noises are generated by the compressor 10 and the refrigerant piping 68, the user feels discomfort at a level expressed roughly as a function of "(the magnitude of vibrations and noises)×(duration time)." Then, there can be two ways to reduce discomfort: "reducing the magnitude of vibrations and noises" and "shortening the duration time." The first embodiment as described above is intended to reduce discomfort by "reducing the magnitude of vibrations and noises." In contrast, the present embodiment is intended to reduce discomfort by "shortening the duration time."

In the present embodiment, the decreasing rate of the speed command value ω* is larger, during the period from time t1 to time t5, than that during the period from time t1 to time t2 in the first embodiment (see FIG. 6), likely to have larger vibrations and noises. However, in the present embodiment, the duration time of vibrations (from time t1 to time t5) is shorter than that in the first embodiment (from time t1 to time t2). This allows for reducing user discomfort, also in the present embodiment, by the same degree as with the first embodiment, or more.

As described above, when the rotation speed of the motor 12 falls within the predetermined range between "ωp+ωk1" and "ωp−ωk2" centered around the resonance frequency ωp, the drive mode controller 48 in the present embodiment controls the motor 12 so that the absolute value of the acceleration of the motor 12 is larger than that when the rotation speed falls otherwise. This allows for shortening the time during which the motor 12 generates vibrations and noises, to reduce user discomfort.

Modifications

The present invention is not limited to the embodiments as described above, and various modifications are possible. The embodiments as described above are shown for the purpose of illustrating the present invention, and are not necessarily limited to those having all the components as described. In addition, some component of an embodiment can be replaced with a component of another embodiment, and some component of an embodiment can be added with a component of another embodiment. Further, some component of each embodiment can be deleted, or added/replaced with another component. Furthermore, the control lines and information lines shown in the drawings indicate what are considered to be necessary for the description, and do not necessarily show all the necessary control lines and information lines on the product. In practice, it is safe to say that almost all the components are mutually connected. Possible modifications to the above embodiments are as follows, to name but a few.

(1) In steps S2, S6, and S14 in the above embodiments, the speed detection value ω1 may be applied instead of the speed command value ω*. That is, it may respectively be determined in steps S2, S6, and S14 whether or not "ω1≤ωp+ωk1," "ω1≥ωp−ωk2," and "ω1≤ωd" hold true.

(2) In the above embodiments, the "one-cylinder rotary compression mechanism" is applied as the compression mechanism 14, but the type of the compression mechanism 14, the number of cylinders, and the like may be appropriately changed. In the above embodiments, the "permanent-magnet three-phase synchronous electric motor" is applied as the motor 12, but the type of the motor 12 may also be changed as appropriate. In the above embodiments, examples are shown to have the IGBT applied as the switching element 22, but a MOSFET (Metal-Oxide-Semiconductor Field-Effect Transistor) or the like may be applied as the switching element 22.

(3) The hardware of the outdoor unit controller 40 and the indoor unit controller 140 (see FIG. 3) in the above embodiments are implemented with general computers, and accordingly the programs and the like in FIGS. 4 and 5 may be stored in a storage medium, or distributed via a transmission path.

(4) The processes shown in FIGS. 4 and 5 have been described as software processes using programs in the above embodiments, but a part or all of them may be replaced with hardware processes using an ASIC (Application Specific Integrated Circuit), an FPGA (Field-Programmable Gate Array), or the like.

The invention claimed is:

1. An air conditioner comprising:
   a compressor that has a motor and a compression mechanism driven by the motor;
   a speed detector that detects a rotation speed of the motor;
   a drive mode controller that controls a drive mode of the motor; and
   refrigerant piping that is connected to the compression mechanism and allows a refrigerant to flow therethrough,
   wherein the drive mode controller, for stopping the motor, is configured to decelerate the motor to a rotation speed equal to or lower than a resonance frequency between the compression mechanism and the refrigerant piping; wherein
   when the rotation speed of the motor falls within a predetermined range centered around the resonance frequency, the drive mode controller is configured to control the motor so that the absolute value of the acceleration of the motor is smaller than that when the rotation speed falls otherwise.

2. The air conditioner according to claim 1, wherein the drive mode controller, for stopping the motor, decelerates the motor to a rotation speed equal to or lower than the resonance frequency between the compression mechanism and the refrigerant piping; while controlling a torque of the motor.

3. The air conditioner according to claim 2, wherein the drive motor controller, for stopping the motor, decelerates the motor to a rotation speed of zero, while controlling a torque of the motor.

4. A motor controller comprising:
   a speed detector that detects a rotation speed of the motor; and
   a drive mode controller that controls a drive mode of the motor, wherein the motor drives a compression mechanism in a compressor of an air conditioner, wherein the compression mechanism is connected to refrigerant piping that allows a refrigerant to flow therethrough,
   the drive mode controller, for stopping the motor, is configured to decelerate the motor to a rotation speed equal to or lower than a resonance frequency between the compression mechanism and the refrigerant piping, and
   when the rotation speed of the motor falls within a predetermined range centered around the resonance frequency, the drive mode controller is configured to control the motor so that the absolute value of the acceleration of the motor is smaller than that when the rotation speed falls otherwise.

* * * * *